US009844991B2

(12) United States Patent
Dusini et al.

(10) Patent No.: US 9,844,991 B2
(45) Date of Patent: Dec. 19, 2017

(54) SUSPENSION FOR A STEERABLE WHEEL OF A MOTOR-VEHICLE WITH A SEMI-VIRTUAL STEERING AXIS

(71) Applicant: FCA Italy S.p.A., Turin (IT)

(72) Inventors: Luca Dusini, Turin (IT); Gaetano Battaglia, Turin (IT)

(73) Assignee: FCA Italy S.p.A., Turin (IT)

( * ) Notice: Subject to any disclaimer, the term of this patent is extended or adjusted under 35 U.S.C. 154(b) by 0 days.

(21) Appl. No.: 15/260,377

(22) Filed: Sep. 9, 2016

(65) Prior Publication Data

US 2017/0072756 A1    Mar. 16, 2017

(30) Foreign Application Priority Data

Sep. 11, 2015 (IT) .................. 102015000050915

(51) Int. Cl.
*B60G 3/18* (2006.01)
*B60G 3/20* (2006.01)
(Continued)

(52) U.S. Cl.
CPC ................ *B60G 3/18* (2013.01); *B60G 3/20* (2013.01); *B60G 7/008* (2013.01); *B60G 13/005* (2013.01);
(Continued)

(58) Field of Classification Search
CPC ........ B60G 3/18; B60G 13/005; B60G 7/008; B60G 3/20; B60G 2200/10;
(Continued)

(56) References Cited

U.S. PATENT DOCUMENTS 2,581,030 A * 1/1952 Kolbe ..................... B60G 3/26
  280/124.103
4,556,238 A * 12/1985 Matschinsky ............ B60G 3/24
  280/124.135
(Continued)

FOREIGN PATENT DOCUMENTS

EP  0265959 A2    5/1988
EP  0441228 A1 *  8/1991 ............... B60G 3/20
(Continued)

OTHER PUBLICATIONS

Search Report dated Jun. 7, 2016, for Italian Patent App. No. 102015000050915, 2 pages.

*Primary Examiner* — Darlene P Condra
(74) *Attorney, Agent, or Firm* — RMCK Law Group, PLC

(57) ABSTRACT

In a suspension for a steerable wheel of a vehicle with a semi-virtual steering axis, a wheel support is connected to vehicle structure by an upper arm and two lower rods, one supporting lateral loads, whereas the other supporting longitudinal loads and being located forwardly relative to the rod supporting lateral loads. In a non-steered wheel condition, an articulated joint connecting the lower rod supporting the longitudinal loads is located more outwardly. The arrangement is such that during steering with a wheel being on an outer side of the curve, an intersection point of projections on a horizontal plane of the lower rods is displaced more inwardly. In a steered wheel condition, with said wheel being on an inner side of the curve, projections on the horizontal plane of said lower rods meet at a point displaced longitudinally forwardly relative to the intersection point in the non-steered wheel condition.

5 Claims, 12 Drawing Sheets

Figure 1:
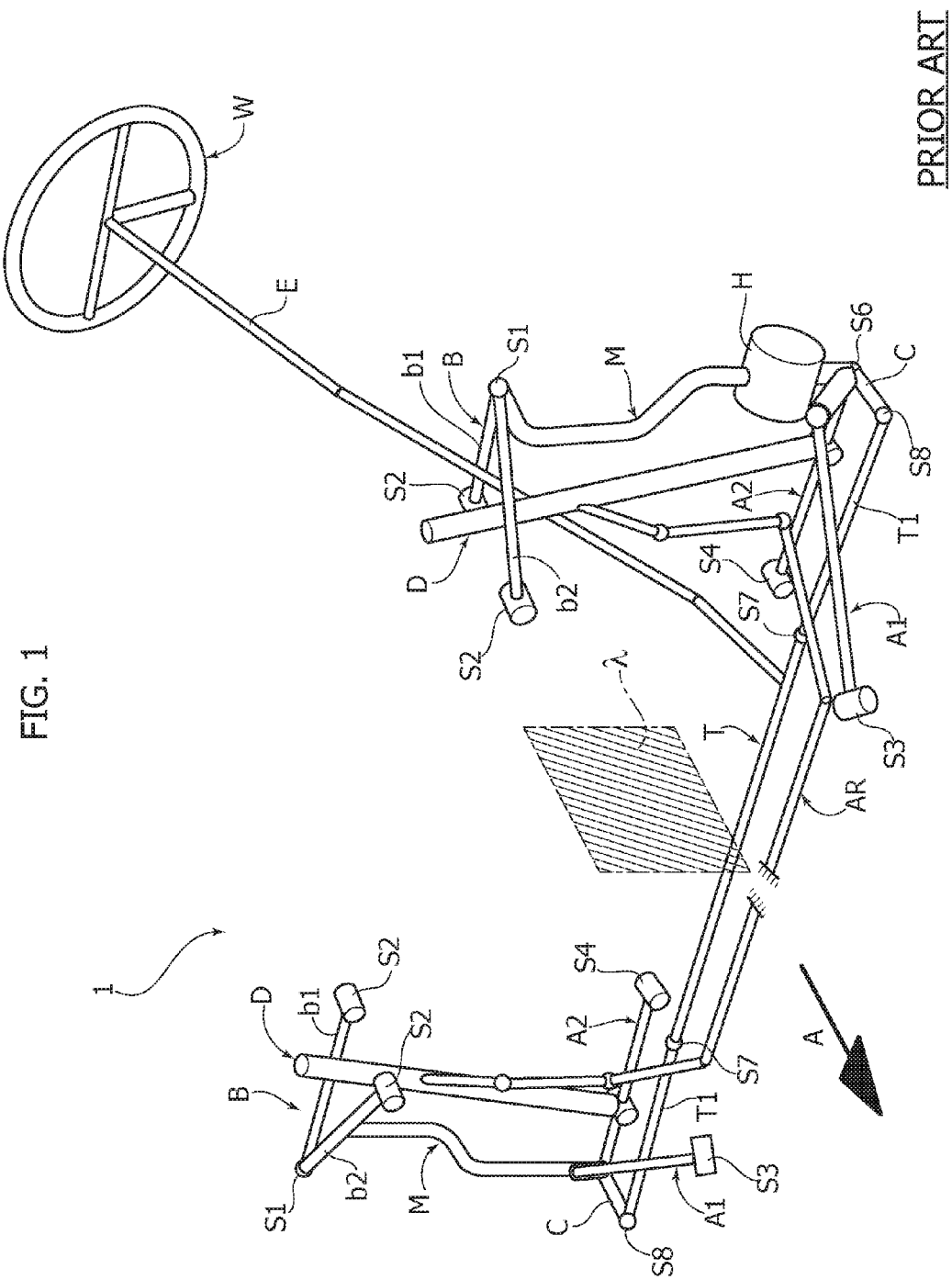

(51) Int. Cl.
   *B60G 7/00* (2006.01)
   *B62D 17/00* (2006.01)
   *B60G 13/00* (2006.01)
   *F16C 11/04* (2006.01)

(52) U.S. Cl.
   CPC .............. *B62D 17/00* (2013.01); *F16C 11/04* (2013.01); *B60G 2200/10* (2013.01); *B60G 2200/18* (2013.01); *B60G 2200/44* (2013.01); *B60G 2200/464* (2013.01); *B60G 2204/148* (2013.01)

(58) Field of Classification Search
   CPC .......... B60G 2200/464; B60G 2200/18; B60G 2200/44; B60G 2204/148; F16C 11/04; B62D 17/00
   See application file for complete search history.

(56) References Cited

U.S. PATENT DOCUMENTS

| | | | |
|---|---|---|---|
| 4,819,959 A * | 4/1989 | Inoue | B60G 3/26 280/124.143 |
| 4,863,188 A | 9/1989 | Killian | |
| 4,878,688 A | 11/1989 | Kubo | |
| 4,941,677 A | 7/1990 | Matsumoto et al. | |
| 5,507,510 A * | 4/1996 | Kami | B60G 3/26 280/124.136 |
| 5,599,839 A * | 2/1997 | Boyd | A61K 31/22 514/546 |
| 7,377,522 B2 * | 5/2008 | MacIsaac | B60G 3/01 280/5.506 |
| 7,862,060 B2 * | 1/2011 | Kageyama | B60G 3/20 280/124.134 |
| 2006/0033301 A1 * | 2/2006 | Roos | B60G 7/02 280/124.125 |
| 2013/0207363 A1 * | 8/2013 | Mighell | B62K 5/027 280/124.103 |
| 2016/0137251 A1 * | 5/2016 | Mercier | B62K 5/05 180/210 |
| 2017/0072756 A1 * | 3/2017 | Dusini | B60G 3/18 |

FOREIGN PATENT DOCUMENTS

| | | |
|---|---|---|
| EP | 0441228 A1 | 8/1991 |
| EP | 0457296 A2 | 11/1991 |
| EP | 2018982 A1 | 1/2009 |
| JP | 2002293118 A | 10/2002 |
| JP | 2010126014 A | 6/2010 |

* cited by examiner

PRIOR ART

SUSPENSION FOR A STEERABLE WHEEL OF A MOTOR-VEHICLE WITH A SEMI-VIRTUAL STEERING AXIS

CROSS REFERENCE TO RELATED APPLICATIONS

This application claims priority to Italian Patent Application No. 102015000050915 filed on Sep. 11, 2015, the entire disclosure of which is incorporated herein by reference.

FIELD OF THE INVENTION

The present invention relates to a suspension for a steerable wheel of a motor-vehicle, with a semi-virtual steering axis, comprising:
a wheel support,
an upper oscillating arm, having one end connected to the wheel support by means of a first articulated joint and an opposite end connected to the motor-vehicle structure by at least one second articulated joint,
a first lower oscillating rod arranged along a direction having at least a component parallel to the longitudinal direction of the motor-vehicle, for supporting the longitudinal loads to which the wheel is subjected, said first lower oscillating rod having a first end connected to the motor-vehicle structure by a first articulated joint and an opposite end connected to the wheel support by a second articulated joint,
a second lower oscillating rod arranged along a direction substantially transverse to the longitudinal direction of the motor-vehicle, for supporting lateral loads to which the wheel is subjected, said second lower oscillating rod having a first end connected to the motor-vehicle structure by a first articulated joint and an opposite end connected to the wheel support by a second articulated joint,
wherein said second articulated joints connecting said lower rods to the wheel support are spaced apart from each other, so that the steering axis of the wheel is a semi-virtual axis passing through the articulated joint for connection of the upper arm to the wheel support and through a point which corresponds approximately to an intersection point between the projections of the two lower rods on a horizontal plane,
the relative positions of said end articulated joints of said first and second lower oscillating roads being such that:
in the condition of non-steered wheel, said intersection point of said two lower rods on a horizontal plane is more spaced away from the longitudinal vertical median plane of the motor-vehicle with respect to said articulated joint connecting the upper arm to the wheel support, so that in a transverse view, the steering axis of the wheel is inclined and forms a kingpin angle with respect to the vertical direction and converges upwards in the direction of the longitudinal vertical median plane of the motor-vehicle,
in the condition of steered wheel, with said wheel being on the outer side of the curve, the projections on a horizontal plane of said lower arms meet at a point closer to the vertical longitudinal median plane with respect to the position of this intersection point in the condition of non-steered wheel, so that, in a transverse view, the steering axis of the wheel assumes a less inclined orientation, during steering, with respect to the vertical direction, which results in a lower kingpin angle,
in the condition of steered wheel, with said wheel being on the inner side of the curve, the projections on a horizontal plane of said lower rods meet at a point more spaced away from the longitudinal vertical median plane of the motor-vehicle with respect to the position of said intersection point in the condition of non-steered wheel, so that, in a transverse view, the steering axis of the wheel assumes a more inclined orientation, during steering, with respect to the vertical direction, which results in a greater kingpin angle.

PRIOR ART

A suspension of the above indicated type is known from document EP 2 018 982 A1.

Figure 2:
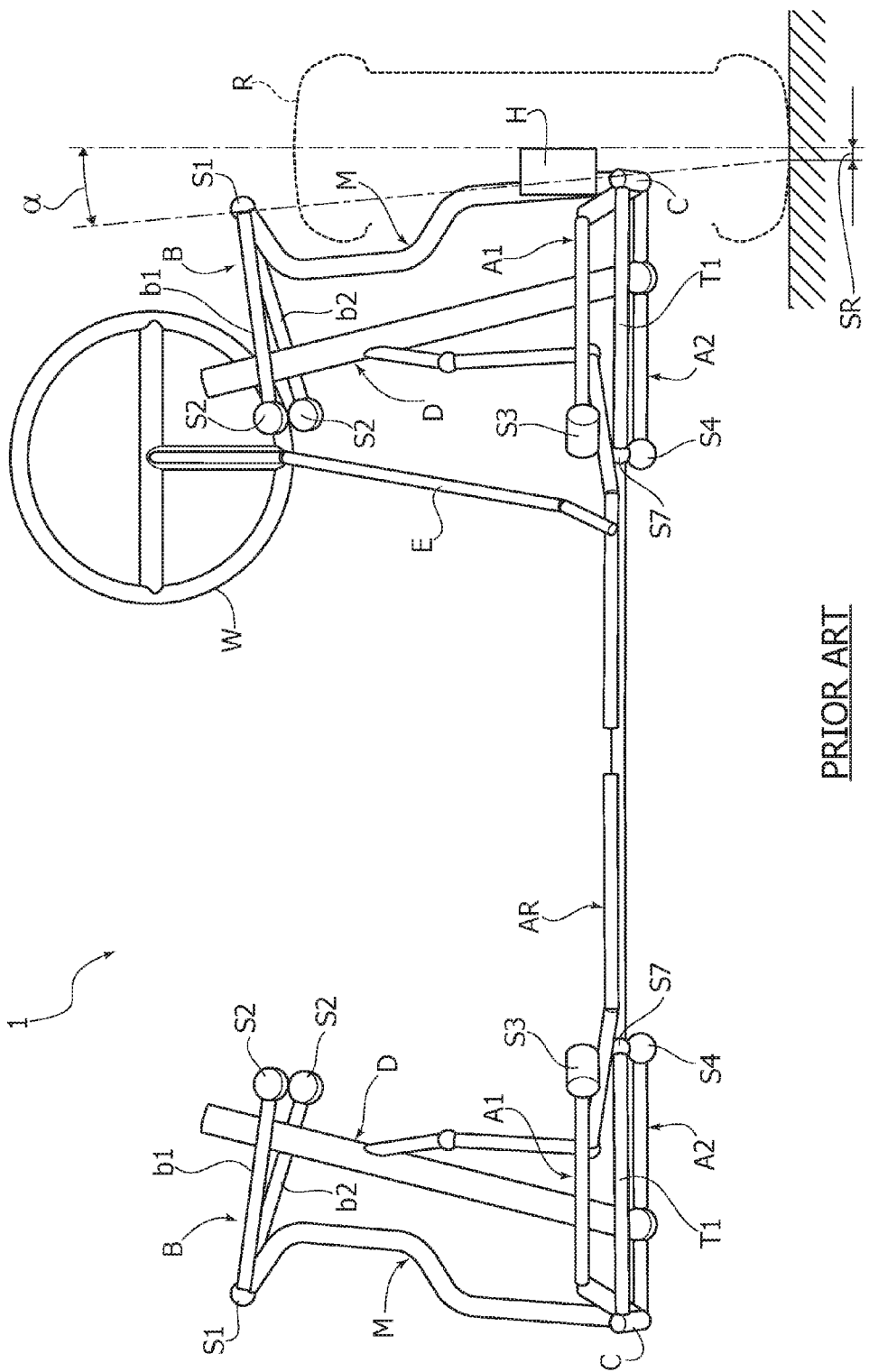
Figure 3:
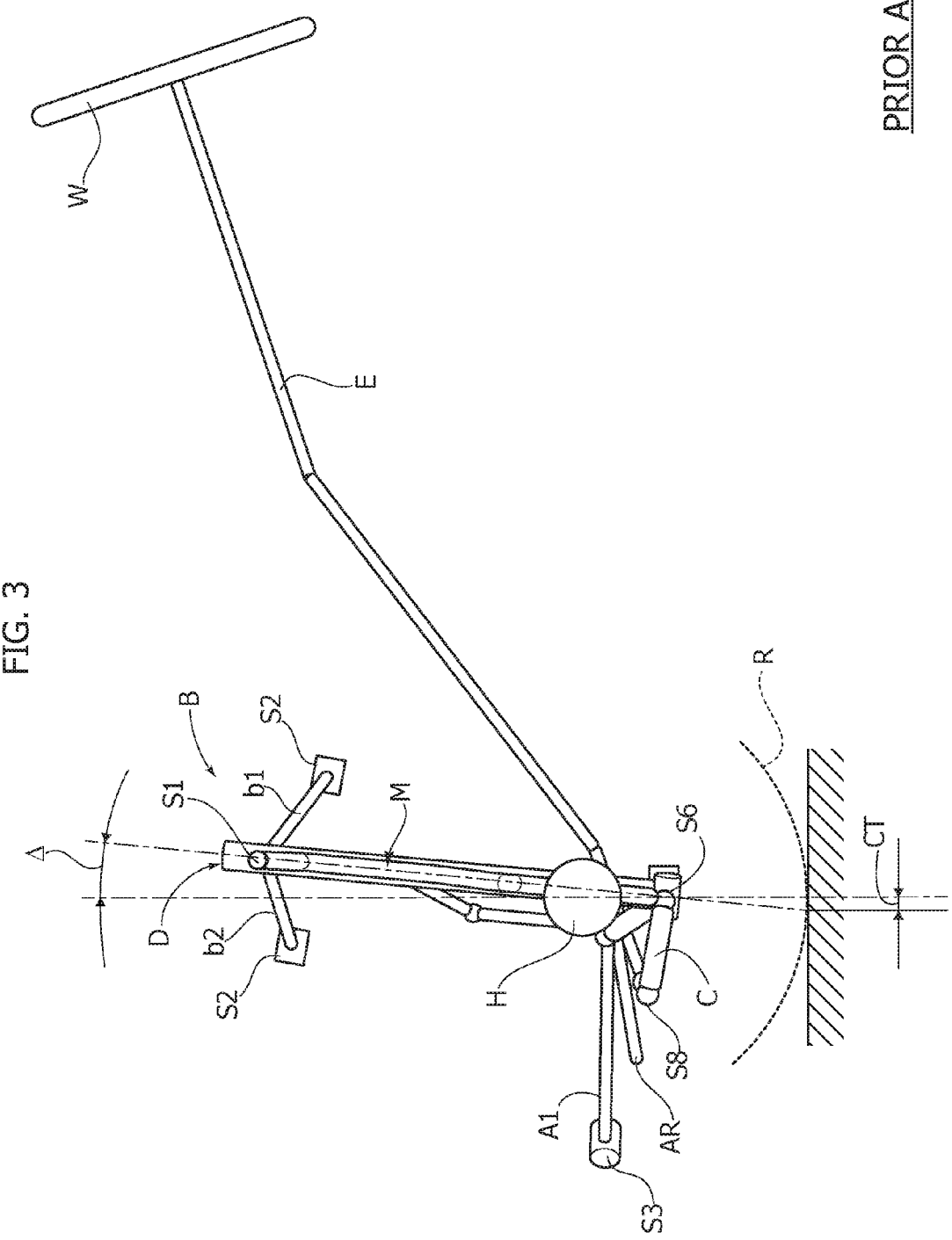

A diagrammatic representation of a suspension with a semi-virtual steering axis is shown in the annexed FIGS. 1-3, which show a three-dimensional view, a transverse view and a lateral elevational view of the suspension.

In these figures, reference numeral 1 generally designates a front suspension for a motor-vehicle, comprising two wheel supports M, diagrammatically shown in the drawings, which include respective supports H (only one of which is shown in FIGS. 1-3) carrying the wheel axles (not shown). Each support M is connected to the motor-vehicle structure (not shown) by an upper oscillating arm B and two lower oscillating rods A1,A2. The upper arm B is constituted by two arm elements b1,b2 arranged in a triangle and converging towards a common articulated joint (S1) for connection to the wheel support M. On the opposite side, the arm elements b1,b2 are connected to the vehicle structure by articulated joints S2 around a common oscillation axis.

In FIGS. 1-3, the articulated joint S1 is shown diagrammatically as a ball and can be constituted by a spherical joint of any known type. The articulated joints S2 are instead shown diagrammatically as bushings and can be constituted by any type of a cylindrical joint defining a main oscillation axis and incorporating a bush of elastomeric material which allows for oscillations of the axis of the cylindrical body of the joint with respect to the main oscillation axis. However, these details of construction are shown here merely by way of example.

The two lower rods A1, A2 are connected to the motor-vehicle structure by articulated joints S3, S4 (which can be for example of the same type as joints S2 or of any other known type), these rods being connected to the support M by two spherical joints S5, S6. As clearly visible in FIGS. 1-3, the lower rod A2 is arranged along a transverse direction with respect to the longitudinal direction of the motor-vehicle, so as to be adapted to support lateral loads to which the wheel is subjected during the movement of the motor-vehicle, whereas the lower rod A1 is arranged along a direction having a component in the longitudinal direction of the motor-vehicle, so as to be adapted to support the longitudinal loads. Furthermore, the lower rod A1 which supports the longitudinal loads is arranged forwardly with respect to the lower rod A2 which supports the lateral loads, with reference to the direction of movement of the motor-vehicle, represented by arrow A in FIG. 1. In general, the positioning of articulated joints S3, S4 along the transverse direction is about the same, so that the rod A2 comes to be shorter than rod A1.

The drawing also shows diagrammatically two cylindrical rods D, which represent the spring-damper units arranged, according to the configuration of a suspension with a quadrilateral linkage, with the upper end pivotally connected to the vehicle structure and a lower end pivotally connected, directly or indirectly, to the rod A2.

Reference AR designates an anti-roll stabilizing bar connected at its center to the motor-vehicle structure and having its opposite ends connected to the wheel supports M. In solutions which are alternative to that of the specific example which is shown, bar AR can be connected, rather than to the wheel support M, to the rod A2, or to other components.

The wheel supports M are also connected to steering tie-rods T1. Each tie-rod T1 is connected by an articulated joint S7 to a central steering rod T, and by an articulated joint S8 to a respective arm C rigidly connected to the wheel support M. The steering rod T is movable in the direction transverse to the longitudinal direction of the motor-vehicle by a steering device of any known type, which is not shown herein, this steering device being controlled, on its turn, in a way known per se, by the steering shaft E driven by the steering wheel W. Naturally, the representation in FIGS. 1-3 which shows the steering shaft E as being rigidly connected to the steering rod T is purely diagrammatic.

In the suspensions of the type shown diagrammatically in FIGS. 1-3, the two lower rods A1, A2 do not converge into a common articulated joint for connection to the wheel support M. Therefore, the steering axis of each wheel is a semi-virtual axis, passing through the articulated joint S1 connecting the upper arm B to the wheel support M, and through a point whose position varies during steering, and which substantially corresponds to the intersection point of the projections of the two lower rods A1, A2 on a horizontal plane (in the general case in which the rods are not coplanar). With reference in particular to FIG. 2, it is also to be noted that this intersection point is more spaced away from the median longitudinal vertical plane of the motor-vehicle (indicated by $\lambda$ in FIG. 1) with respect to the above mentioned articulated joint S1 connecting the upper arm B to the wheel support M, so that the steering axis of the wheel viewed in a transverse plane, is inclined with respect to the vertical direction and converges upwardly towards the median longitudinal vertical plane of the motor-vehicle, defining an angle $\alpha$ called "kingpin angle". As also clearly visible in FIG. 2, the steering axis meets the ground at a point which is spaced by a transverse distance SR (called "scrab radius") with respect to the median plane of the wheel (which is shown partially by a dotted line and designated by R in FIGS. 2, 3). Furthermore, as shown in FIG. 3, the steering axis is inclined with respect to the vertical also when it is viewed laterally, so as to define a "caster" angle $\Delta$. As also shown in FIG. 3, in a lateral view the steering axis meets the ground at a point spaced by a longitudinal distance CT (called "caster trail").

Figure 4:
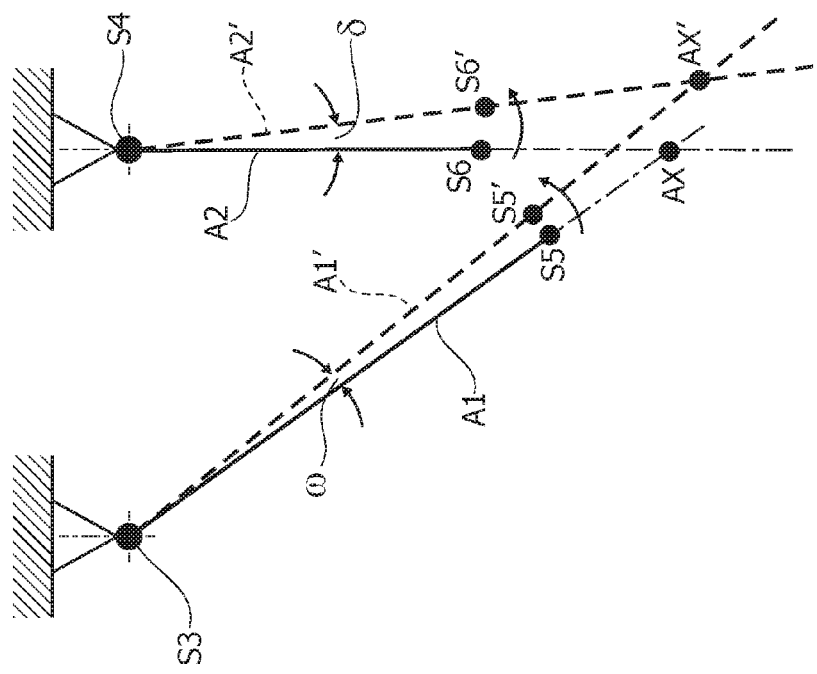

FIG. 4 of the annexed drawings again refers to the conventional prior art and shows a diagrammatic plan view of the lower rods A1, A2 of the left front wheel of the motor-vehicle (the direction of movement is leftwards in this figure), respectively in the condition of non-steered wheel and in the condition of the wheel being steered to the right (i.e. in the condition in which the steered wheel is on the outer side of the curve made by the motor-vehicle). In this figure, the articulated joints S3 and S4 are shown as spherical joints rather than as cylindrical joints, but, as already indicated, these details of construction may widely vary within the frame of the solutions described herein. As shown in FIG. 4, in this known solution the relative positions of articulated joints S3, S4, S5, S6 are such that when the wheel is steered, with the wheel being on the outer side of the curve, the rods A1 and A2 come to positions A1' and A2', with the articulated joints S5 and S6 going to S5' and S6'. As shown, since the articulated joints S5 and S6 are connected to the wheel support M, they move around the axis of instantaneous rotation AX. Due to the positioning of the articulated joints S5 and S6, the movement of S5 is shorter than that of S6, since segment S5-AX is shorter than segment S6-AX. For this reason, the distance between the two points S5 and S6 increases. Furthermore, since the rod A2 is shorter than the rod A1 (together with the fact that S5-AX is shorter than S6-AX) the angle $\omega$ traced by rod A1 is lower than angle $\alpha$ traced by rod A2 and therefore the intersection point AX moves outwardly. This means that the steering axis of the wheel, which passes both through the articulated joint S1 connecting the upper arm B to the wheel support M, and through the intersection point AX, assumes an orientation which is more inclined with respect to the vertical during steering, which corresponds to an increase of the kingpin angle.

This causes a relevant reduction of the caster trail CT of the suspension. The relevant reduction of the caster trail CT which takes place during steering, with the wheel on the outer side of the curve, causes a non-gradual reduction of the load on the steering wheel during steering, with a resulting feeling on the steering wheel for the driver which is not ideal.

Document EP 2 018 982 A1 shows a solution in which the kingpin angle decreases when the wheel is steered and is on the outer side of the curve, and wherein the kingpin angle increases when the wheel is steered and is on the inner side of the curve. In this known solution however the intersection point of the lower rods has no substantial movement in the longitudinal direction of the motor-vehicle, in one direction or the other, as a result of the steering of the wheel.

Object of the Invention

The object of the present invention is that of providing a suspension for a steerable wheel, with a semi-virtual steering axis, in which the driver's feeling on the steering wheel during steering is greatly improved.

A further object of the invention is that of achieving the above indicated purpose while maintaining all the advantageous features of the suspensions of the type discussed herein.

Furthermore, a further object lies in achieving the above indicated goals with no relevant complications in construction and with no increases in cost.

SUMMARY OF THE INVENTION

In view of achieving the above indicated objects, the invention provides a suspension having all the features which have been indicated at the beginning of the present description and further characterized in that the relative positions of said first and second end articulated joints of said first and second lower oscillating rods are such that in the condition of steered wheel, with said wheel being on the inner side of the curve, the projections of said lower rods on a horizontal plane meet at a point located longitudinally more forwardly with respect to the position of said intersection point in the condition of non-steered wheel, in such a way that, in a lateral view, the steering axis forms a caster angle with respect to the vertical direction that is greater than the value of the same angle in the condition of non-steered wheel, said suspension being in particular characterized in that:

said first articulated joints of the two lower rods are substantially aligned with each other along a direction parallel to the longitudinal direction of the motor-vehicle, said second lower rod is substantially orthogonal to said longitudinal direction in the condition on non-steered wheel, said first lower rod has a greater length than the length of the second lower rod, the second articulated joint of the first lower rod is positioned closer to the longitudinal median plane of the motor-vehicle with respect to the second articulated joint, when the wheel is not steered, a ratio (L1/b) between the length (L1) of said first lower rod and a first distance (b) of said second articulated joint of said first lower rod from said intersection point amounts at least to 5 and preferably at least to 10, and the ratio (L2/a) between the length (L2) of the second lower rod and a second distance of said second articulated joint from said intersection point amounts at least to 5 and preferably at least to 10.

Due to the above indicated features, on the steered wheel on the inner side of the curve the steering axis increases its inclination with respect to the vertical direction, both in a lateral view (increase of the caster angle) and in a transverse view (increase of the kingpin angle).

In the suspension system according to the invention, for the steered wheel which is on the outer side of the curve, the movement of the steering axis towards the vertical direction corresponds to a reduction of the kingpin angle, whereas the caster angle remains approximately the same, with the result of a lower decrease, with respect to the conventional solutions, of the caster trail of the suspension during steering. For the steered wheel which is on the inner side of the curve, the increase of the caster angle causes instead an increase of the caster trail, which has a beneficial effect in compensating the reduction of the loads acting on the steering system due to the reduction of lateral and vertical loads on this wheel due to the transfer of load during the curve.

These effects give rise to a high regularity of the increase of the load on the steering wheel along the curve and hence to an excellent feeling on the steering wheel for the driver.

DESCRIPTION OF THE DRAWINGS AND A PREFERRED EMBODIMENT

Figure 5:
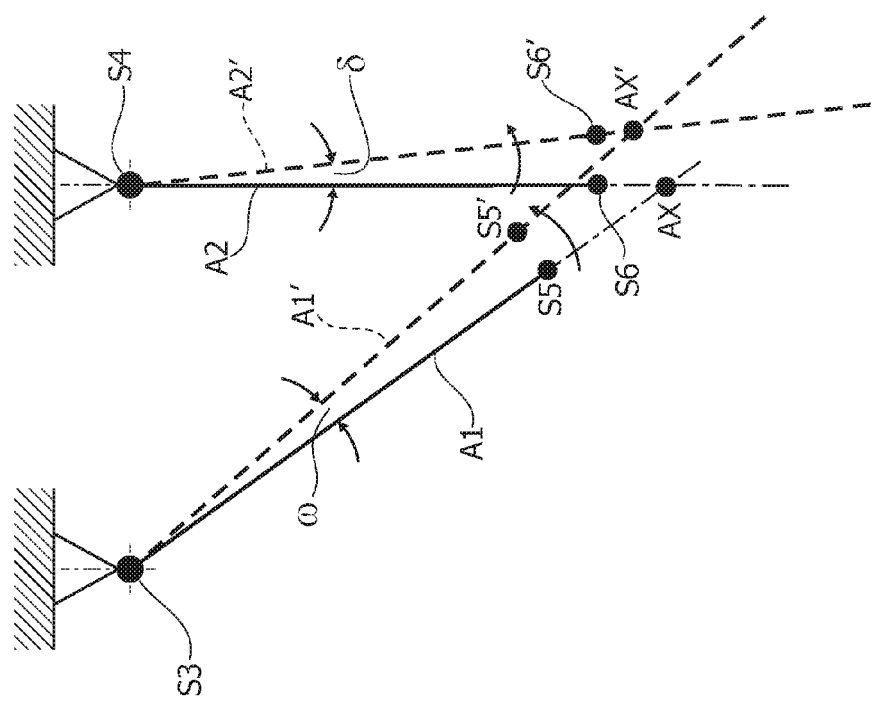
Figure 6:
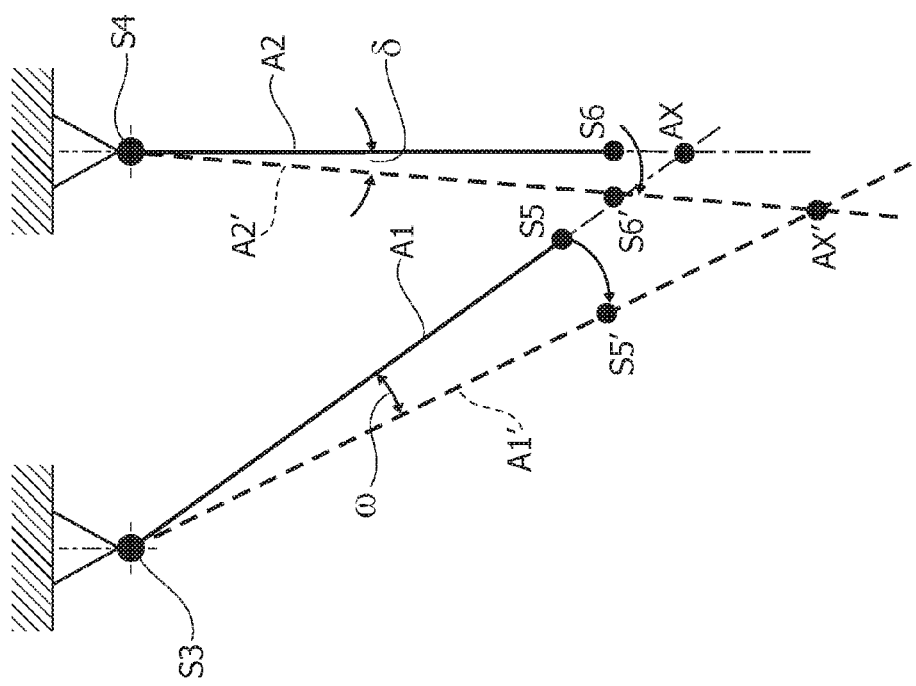
Figure 7:
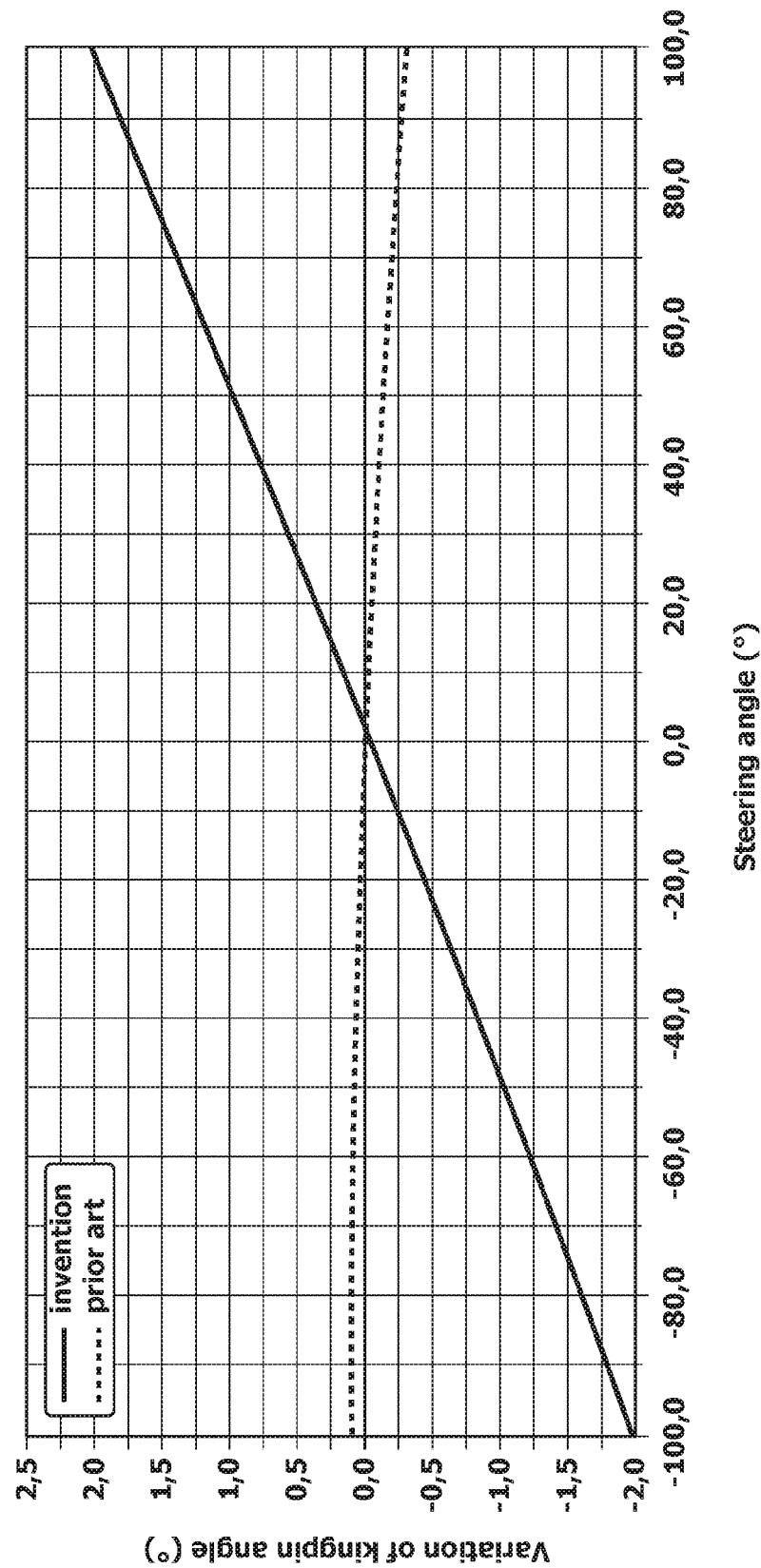
Figure 8:
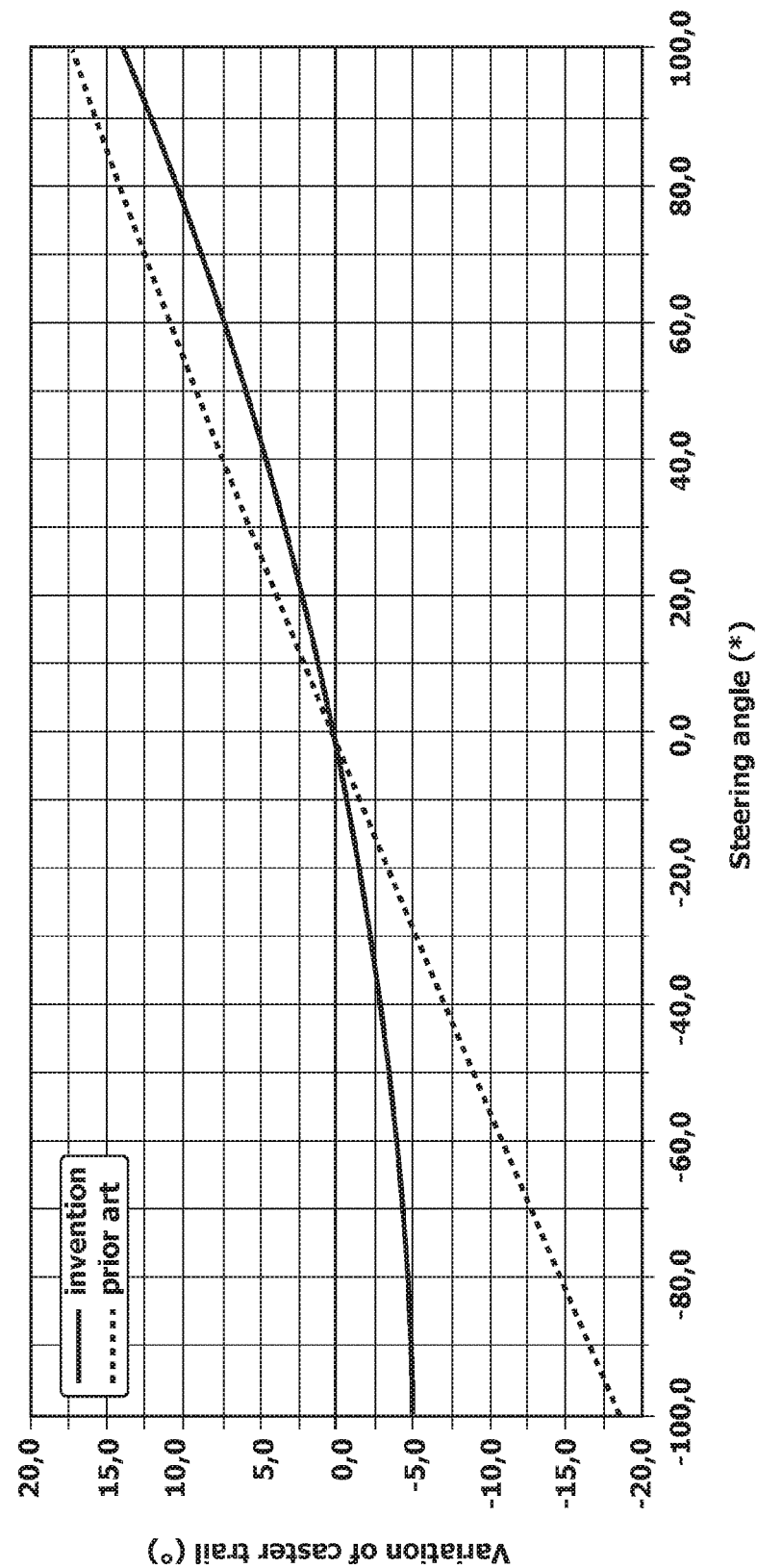
Figure 9:
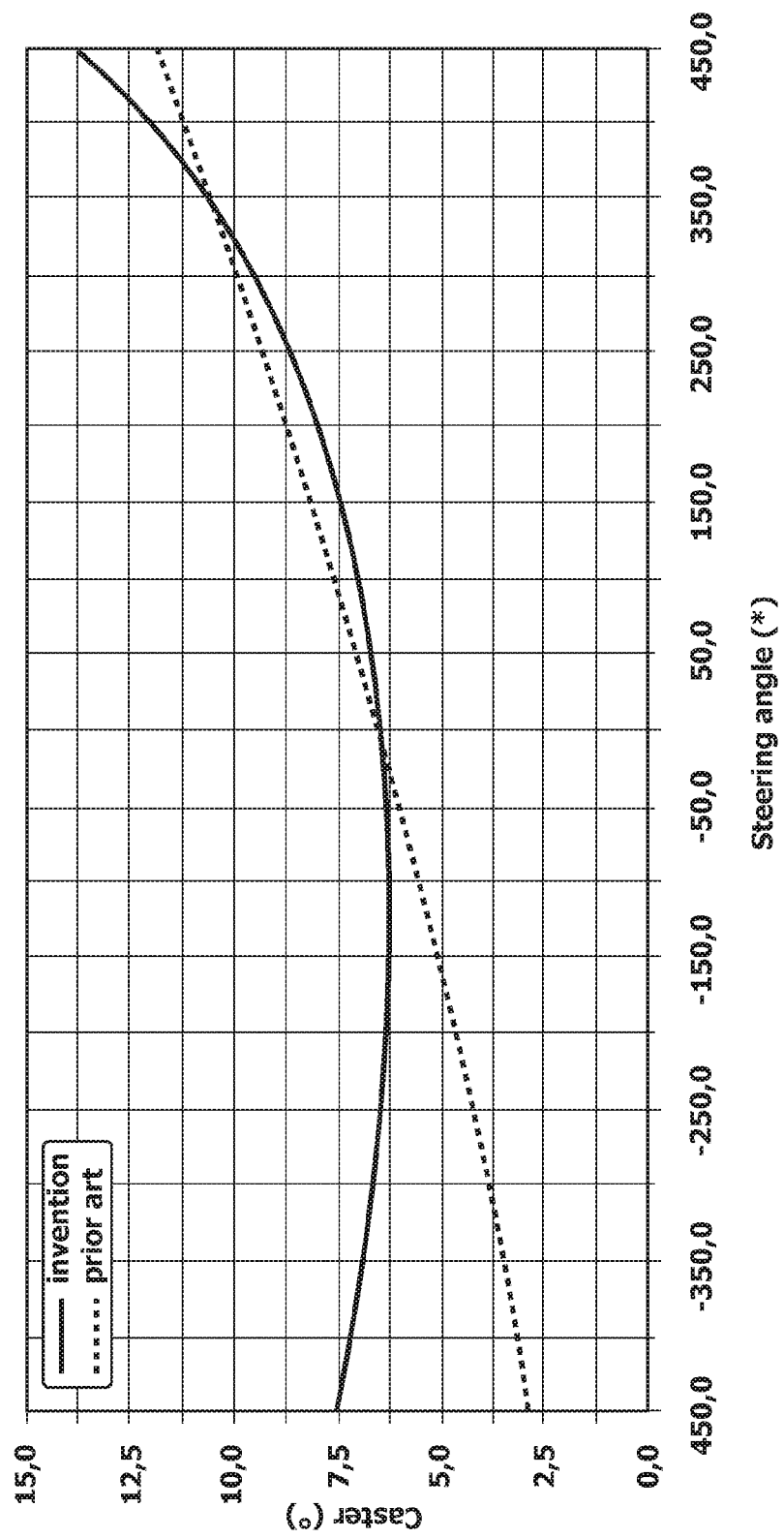
Figure 10:
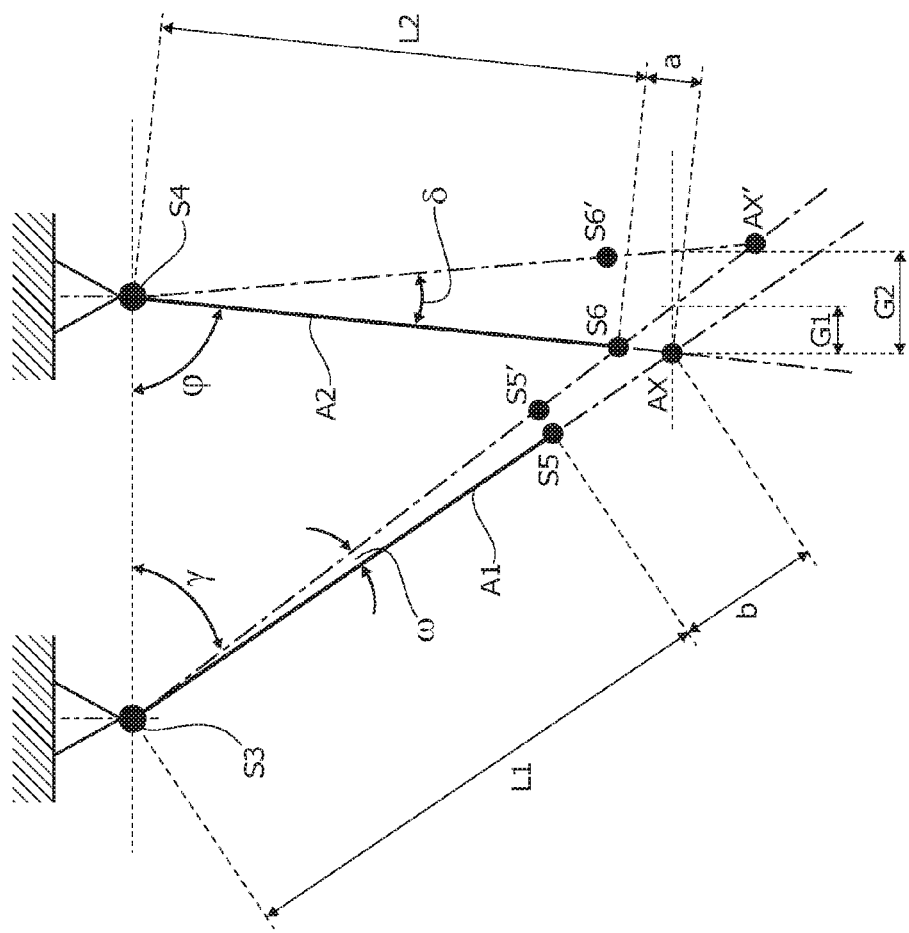
Figure 11:
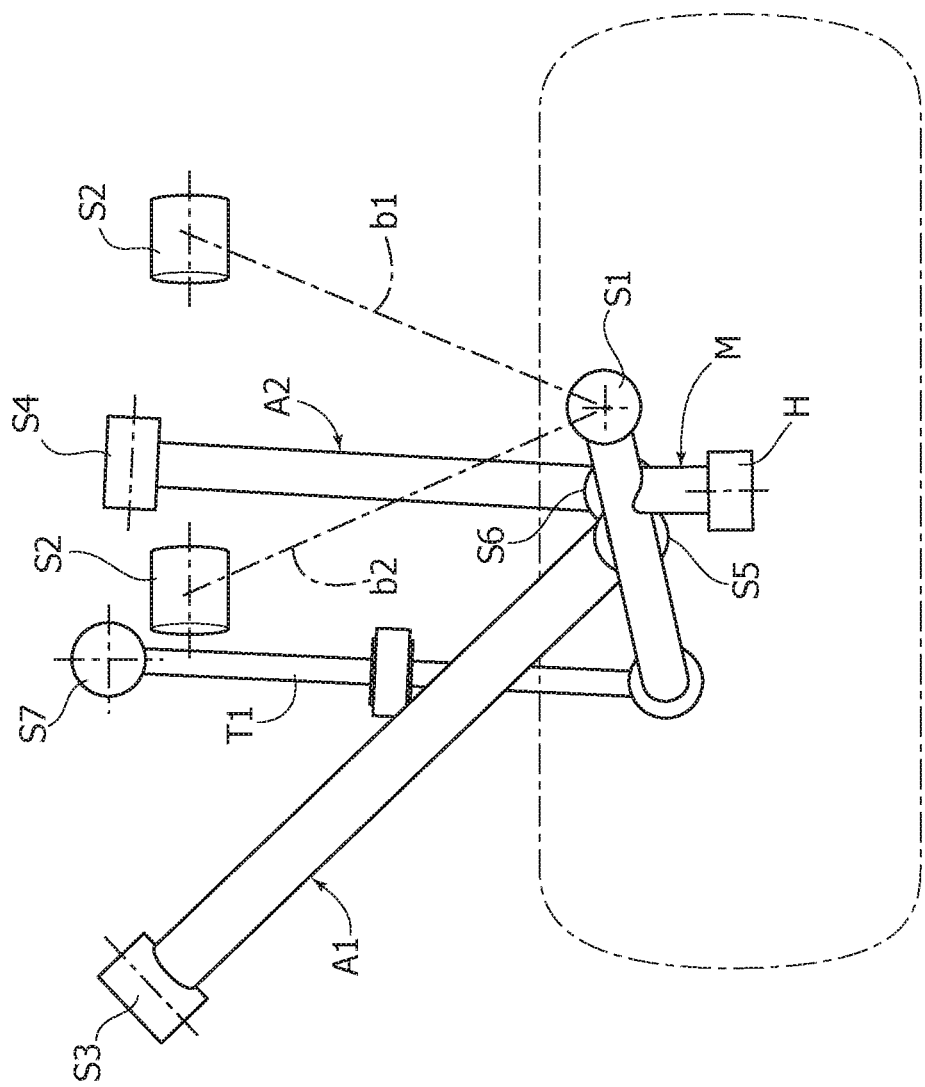
Figure 12:
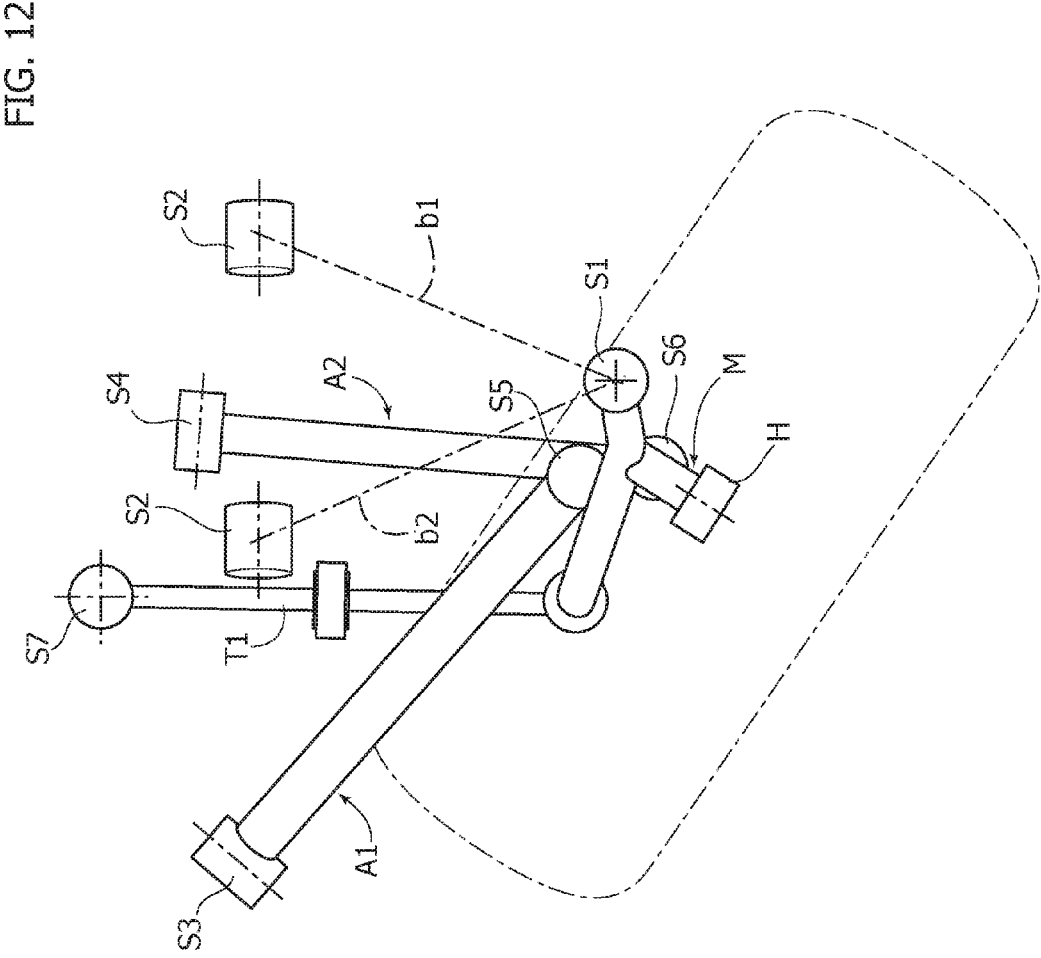

Further features and advantages of the invention will become apparent from the description which follows with reference to the annexed drawings, given purely by way of non limiting example, in which:

FIGS. 1-3, already described in the foregoing, are a diagrammatic perspective view, a transverse view and a lateral view of a suspension for a steering wheel of a motor-vehicle with a semi-virtual steering axis, of known type discussed herein, FIG. 4, also described in the foregoing, is a diagrammatic plan view of the lower rods forming part of a suspension according to the prior art, respectively in a condition of non-steered wheel and in the condition of steered wheel, with the wheel being on the outer side of the curve, FIG. 5 is a plan diagrammatic view of the lower rods forming part of a suspension according to the invention, respectively in the condition of non-steered wheel and in the condition of steered wheel, with the wheel being on the outer side of the curve, FIG. 6 is a diagrammatic plan view of the lower rods forming part of a suspension according to the invention, respectively in the condition of non-steered wheel and in the condition of steered wheel, with wheel on the inner side of the curve, FIGS. 7, 8, 9 are diagrams which show the advantages of a suspension according to the invention, FIG. 10 is a diagram similar to that of FIG. 5, which will be used herein to define the geometrical characteristics of the suspension according to the invention, and FIGS. 11, 12 are two diagrams similar to that of FIG. 5, which show the non-steered wheel and the steered wheel in the case of another exemplary embodiment of the invention.

The suspension according to the invention is of the general type shown in FIGS. 1-3, which have been discussed in the foregoing. FIG. 5 shows the same diagram of FIG. 4, but also shows how the above mentioned drawback is overcome with the present invention.

The suspension of the invention basically has the same characteristics of the known suspension which has been described above with reference to FIGS. 1-3, except only for the difference which is described in the following with reference to FIGS. 5 and 6. In FIG. 6, the various parts shown herein are designated by the same reference numerals used in FIG. 5. The characteristic which distinguishes the suspension according to the invention from the known suspension described above lies in that in this case in the condition of non-steered wheel, the articulated joint S5 connecting the rod A1 to the wheel support M is located closer to the median longitudinal vertical plane of the motor-vehicle with respect to the articulated joint S6 connecting the rod A2 to the wheel support. As a consequence of this arrangement, during steering of the wheel, with the wheel being on the outer side of the curve, the connecting joint S5 moves to the position designated by S5' and the lower rod A1 moves to the position A1'. Therefore, the intersection point between rods A1, A2 moves from the position AX to the position AX', closer to the median longitudinal vertical plane of the motor-vehicle, i.e. it moves further towards the inside of the motor-vehicle. As already indicated in the foregoing, the steering axis defined in any steering condition passes through the articulated joint S1 connecting the upper arm B to the wheel support M and, to a certain degree of approximation, through the intersection point AX. As a result of this, the movement of the intersection point AX to the position AX' causes the steering axis to become more vertical, which means that the steering axis assumes an orientation forming a smaller angle with respect to the vertical, which causes a reduction of the kingpin angle.

FIG. 6 shows steering of the wheel, with the wheel being on the inner side of the curve. The connecting joint S6 is moved to the position designated by S6' and a lower rod A2 moves to the position A2'. The articulated joint S5 instead moves to the position designated by S5' and the lower rod A1 moves to the position A1'. Therefore, the intersection point between rods A1 and A2 is displaced from position AX to a position AX', moving in the longitudinal direction, forwardly and outwardly of the vehicle. This behaviour causes an increase of the kingpin angle and the caster angle on the wheel which is on the inner side of the curve.

The above indicated features of the suspension according to the invention derive from a suitable choice of the relative positions of the end articulated joints S1, S2, S3, S4 of the two rods A1 and A2.

With reference to FIG. 10 of the annexed drawings, the different parameters to be considered are the following:

$\gamma$=angle of rod A1 with respect to the longitudinal direction X of the motor-vehicle, φ=angle of rod A2 with respect to the longitudinal direction X of the motor-vehicle, L1=length of rod A1, L2=length of rod A2, G1=distance between the starting center AX of instantaneous rotation and the intersection between the extension of rod A1 after steering and an axis parallel to the longitudinal direction of the motor-vehicle and passing through AX, G2=distance between the starting center AX of instantaneous rotation and the intersection between the extension of rod A2 after steering and an axis parallel to the longitudinal direction of the motor-vehicle and passing through AX, b=distance between AX and S5, a=distance between AX and S6, θ=rotation of the wheel support and the wheel (around the axis of instantaneous rotation AX).

According to the invention, in order to obtain that the kingpin axis decreases during steering for a wheel which is on the outer side of the curve, it is necessary that:

$$G1 > G2$$

In the assumption of a relatively small rotation (the first moments of the steering manoeuvre are considered) the following equations apply:

$$G1 = \frac{(L1+b)*\omega}{\sin\gamma}$$

$$G2 = \frac{(L2+a)*\sigma}{\sin\varphi}$$

$$\omega = \frac{b*\theta}{L1}$$

$$\sigma = \frac{a*\theta}{L2}$$

The condition G1>G2 becomes therefore the following:

$$\frac{(L1+b)*b}{\sin\gamma*L1} > \frac{(L2+a)*a}{\sin\varphi*L2} \quad (1)$$

According to the present invention L1 is much greater than b and L2 is much greater than a, so that terms b and a in the relation (1) can be neglected. In this case, relation (1) is simplified:

$$\frac{b}{\sin\gamma} > \frac{a}{\sin\varphi} \quad (2)$$

In the preferred embodiment of the invention, each of the ratios L1/b and L2/a amounts at least to 5 and preferably at least to 10. In a preferred embodiment values of these ratios have been adopted which are also greater than 30.

If the articulated joint S6 is located more "outwardly" with respect to S5, i.e. it is more far away from the median longitudinal line of the motor-vehicle, b will be greater than a, so that relation (2) is further simplified:

$$\frac{1}{\sin\gamma} > \frac{1}{\sin\varphi} \quad (3)$$

For all practical purposes, the desired object may be achieved for example due to the following conditions:

joints S3 and S4 substantially aligned with each other along a direction parallel to the longitudinal direction of the motor-vehicle, joint S5 located closer to the longitudinal median plane of the motor-vehicle with respect to joint S6, when the wheel is not steered, sinus of angle (γ) of the rod A1 in a plane parallel to the ground lower than the sinus of angle φ of rod A2 in the plane parallel to the ground (which is for example surely true if rod A2 is substantially orthogonal to the longitudinal direction of the motor-vehicle), length of rod A1 much greater than the distance of joint S5 from the steering axis and length of rod A2 much greater than the distance of joint S6 from the steering axis.

The diagram of FIG. 7 compares the variation of the kingpin angle which takes place in a suspension of the conventional type shown in FIG. 4 and the suspension according to the invention. This figure shows the variation of the kingpin angle as a function of the steering angle, where the steering angle is 0° in the condition of non-steered wheel, whereas the steering angle assumes negative values in the case of steering with the wheel being on the outer side of the curve, and positive values in the case of steering with the wheel being on the inner side of the curve. It is to be noted that the diagram of FIG. 7 shows the variation of the kingpin angle which takes place with respect to the value of this angle in the condition of non-steered wheel. In the case of a suspension according to the prior art, the kingpin angle with a non-steered wheel is in the order of 5°. As visible from the diagram of FIG. 7, in the case of the conventional art (dotted line) with a steered wheel being on the outer side of the curve, the kingpin angle has a positive variation, which means that it assumes values greater than 5°. On the contrary, in the case of the invention, the kingpin angle has a negative variation. For example, for a steering angle of −40° the variation of the kingpin angle is −0.75°, which means that the king angle varies from a value of about 5° to a value of 4.25°.

This decrees of the value of the kingpin angle corresponds to the steering axis becoming more vertical, i.e. oriented with a smaller angle with respect to the vertical.

This corresponds at the same time to a lower decrease of the value of the caster trail of the suspension, as readily apparent from the diagram of FIG. 8. In this diagram, the variations of the caster trail CT of the suspension according to the conventional art and the suspension according to the invention are shown, as a function of the steering angle. As shown, the suspension according to the invention produces a greatly lower variation of the caster trail. This gives rise to an extreme regularity of the increase of the load on the steering wheel during a curve, which determines an excellent feeling on the steering wheel for the driver. This effect is obtained due to that in the case of the invention (see FIG. 5) the movement from S6 to S6' is reduced because point S6 is closer to point AX (with respect to S5) and because rod A2 is arranged in a transverse direction.

Similarly, in the case of steered wheel with a wheel being on the inner side of the curve, as shown in the diagrams of FIGS. 7,8 and also in the diagram of FIG. 9, an increase of the kingpin angle and the caster angle takes place with a resulting increase of the caster trail. For the wheel on the inner side of the curve this has a positive effect, because the loads acting on the steering wheel are increased and compensate the reduction of load due to the reduction of the lateral forces acting on the wheel during transfer of the load in a curve.

Furthermore, in the suspension according to the invention the variation of the caster angle during steering is a non-linear variation (differently from the conventional solution). On the wheel located on the inner side of the curve, in particular, there is a high caster angle for high steering angles, with a resulting relevant increase of the camber angle. This enables the footprint of the tire on the ground in a curve to be optimized, because the wheel is maintained orthogonal to the ground, with a resulting lower wear of the tire.

FIGS. 11, 12 are two diagrams similar to that of FIG. 5 which show the non-steered wheel and the steered wheel with the wheel being on the outer side of the curve, in the case of another exemplary embodiment of the invention. In this case the two lower rods A1, A2 are arranged so that during steering of the wheel, with the wheel being on the outer side of the curve, the two rods come to cross each other, according to a scissor-like configuration. This solution is implemented with suitable configuration and positioning of rods A1, A2 (shown only diagrammatically in the drawing) in order to avoid their interference during operation. In an actual embodiment, this result has been obtained through a relevant spacing of the two lower rods A1, A2 along the vertical direction, which causes the need of designing accordingly the wheel support and the portions of the wheel support which are provided for connection to the suspension components. Furthermore, one or both the rods A1, A2 may have a non-straight configuration, for the same purpose.

Naturally, while the principle of the invention remains the same, the details of construction and the embodiments may widely vary with respect to what has been described and shown purely by way of example, without departing from the scope of the present invention.

In particular, the present invention applies also to a suspension of the McPherson type, in which the function of the upper arm of the suspension is fulfilled by a damper unit, this unit being connected to the structure of the motor-vehicle at its upper end and to the wheel support at its lower end, so as to guide the movement of the wheel support with respect to the vehicle body.

What is claimed is:

1. A suspension for a steerable wheel of a motor vehicle, with a semi-virtual steering axis, comprising:
   a wheel support,
   an upper oscillating arm, having one end connected to the wheel support by a first articulated joint and an opposite end connected to a vehicle structure by at least one second articulated joint,
   a first lower oscillating rod arranged along a direction having at least a component parallel to a longitudinal direction of the motor vehicle, for supporting longitudinal loads to which the wheel is subjected, said first lower oscillating rod having a first end connected to the vehicle structure by a third articulated joint and an opposite end connected to the wheel support by a fifth articulated joint,
   a second lower oscillating rod arranged along a direction substantially transverse to the longitudinal direction of the motor vehicle, for supporting lateral loads to which the wheel is subjected, said second lower oscillating rod having a first end connected to the vehicle structure by a fourth articulated joint and an opposite end connected to the wheel support by a sixth articulated joint,
   wherein said fifth and sixth articulated joints connecting said respective first and second lower oscillating rods to the wheel support are spaced apart from each other, so that a steering axis of the wheel is a semi-virtual axis passing through the first articulated joint for connection of the upper oscillating arm to the wheel support and through a first point which corresponds approximately to an intersection point between projections of the first and second lower oscillating rods on a horizontal plane,
   wherein relative positions of the fifth and sixth articulated joints of said respective first and second lower oscillating rods being such that:
   in a condition of non-steered wheel, said intersection point of said first and second lower oscillating rods on the horizontal plane is more spaced away from a longitudinal vertical median plane ($\lambda$) of the motor vehicle with respect to said first articulated joint connecting the upper oscillating arm to the wheel support, so that, in a transverse view, the steering axis of the wheel is inclined and forms a kingpin angle ($\alpha$) with respect to a vertical direction and converges upwards in a direction of the longitudinal vertical median plane of the motor vehicle,
   in a condition of steered wheel, with said wheel being on an outer side of a curved path of the motor vehicle, projections on the horizontal plane of said first and second lower oscillating rods meet at a second point closer to the vertical longitudinal median plane of the motor vehicle with respect to a position of said intersection point in the condition of non-steered wheel, so that, in the transverse view, the steering axis of the wheel assumes a less inclined orientation, during steering, with respect to the vertical direction, which results in a lower kingpin angle,
   in the condition of steered wheel, with said wheel being on an inner side of the curved path of the motor vehicle, projections on the horizontal plane of said first and second lower oscillating rods meet at a third point more spaced away from the longitudinal vertical median plane of the motor vehicle with respect to the position of said intersection point in the condition of non-steered wheel, so that, in the transverse view, the steering axis of the wheel assumes a more inclined orientation, during steering, with respect to the vertical direction, which results in a greater kingpin angle,
   wherein relative positions of the fifth and sixth articulated joints of said respective first and second lower oscillating rods are such that in the condition of steered wheel, with said wheel being on the inner side of the curved path of the motor vehicle, the projections on the horizontal plane of said first and second lower oscillating rods meet at a fourth point located longitudinally more forwardly with respect to the position of said intersection point in the condition of non-steered wheel, in such a way that, in a lateral view, the steering axis forms a caster angle ($\Delta$) with respect to the vertical direction that is greater than a value of the same angle in the condition of non-steered wheel,
   wherein said third and fourth articulated joints of the first and second lower oscillating rods are substantially aligned with each other along a direction parallel to the longitudinal direction of the motor vehicle,
   wherein said second lower oscillating rod is substantially orthogonal to said longitudinal direction of the motor vehicle in the condition of non-steered wheel, wherein said first lower oscillating rod has a length (L1) greater than a length (L2) of the second lower oscillating rod, wherein said fifth articulated joint of the first lower oscillating rod is positioned closer to the longitudinal median plane of the motor vehicle relative to the sixth articulated joint of the second lower oscillating rod in the condition of non-steered wheel, wherein a ratio between the length of said first lower oscillating rod and a first distance (b) of said fifth articulated joint of said first lower oscillating rod from said intersection point amounts at least to 5, wherein a ratio between the length of the second lower oscillating rod and a second distance (a) of said sixth articulated joint of said second lower oscillating rod from said intersection point amounts at least to 5.

2. The suspension according to claim 1, wherein values of the lengths L1, L2 of the respective first and second lower oscillating rods, values of said first and second distances (b, a) and values of angles (γ, e, φ) formed by respective projections on the horizontal plane of said first and second lower oscillating rods with respect to the longitudinal direction of the motor vehicle are selected so as to satisfy the following relation:

$$\frac{(L1+b)*b}{\sin\gamma * L1} > \frac{(L2+a)*a}{\sin\varphi * L2}.$$

3. The suspension according to claim 1, wherein said first and second lower oscillating rods are shaped and arranged in such a way that in the condition of steered wheel, with the wheel arranged on the outer side of the curved path of the motor vehicle, projections of said first and second lower oscillating rods on the horizontal plane come to intersect each other.

4. The suspension according to claim 1, further comprising a spring-damper unit arranged with an upper end articulated to the vehicle structure and a lower end articulated, directly or indirectly, to said second lower oscillating rod.

5. The suspension according to claim 1, wherein the ratio between the length of said first lower oscillating rod and the first distance of said fifth articulated joint of said first lower oscillating rod from said intersection point amounts at least to 10, and wherein the ratio between the length of the second lower oscillating rod and the second distance of said sixth articulated joint of said second lower oscillating rod from said intersection point amounts at least to 10.

* * * * *